358-190. OR 3,217,101 SR
[redacted]
SEARCH ROOM
Nov. 9, 1965 L. J. MATTINGLY 3,217,101
TELEVISION RECEIVER POWER SUPPLY
Filed Nov. 8, 1961
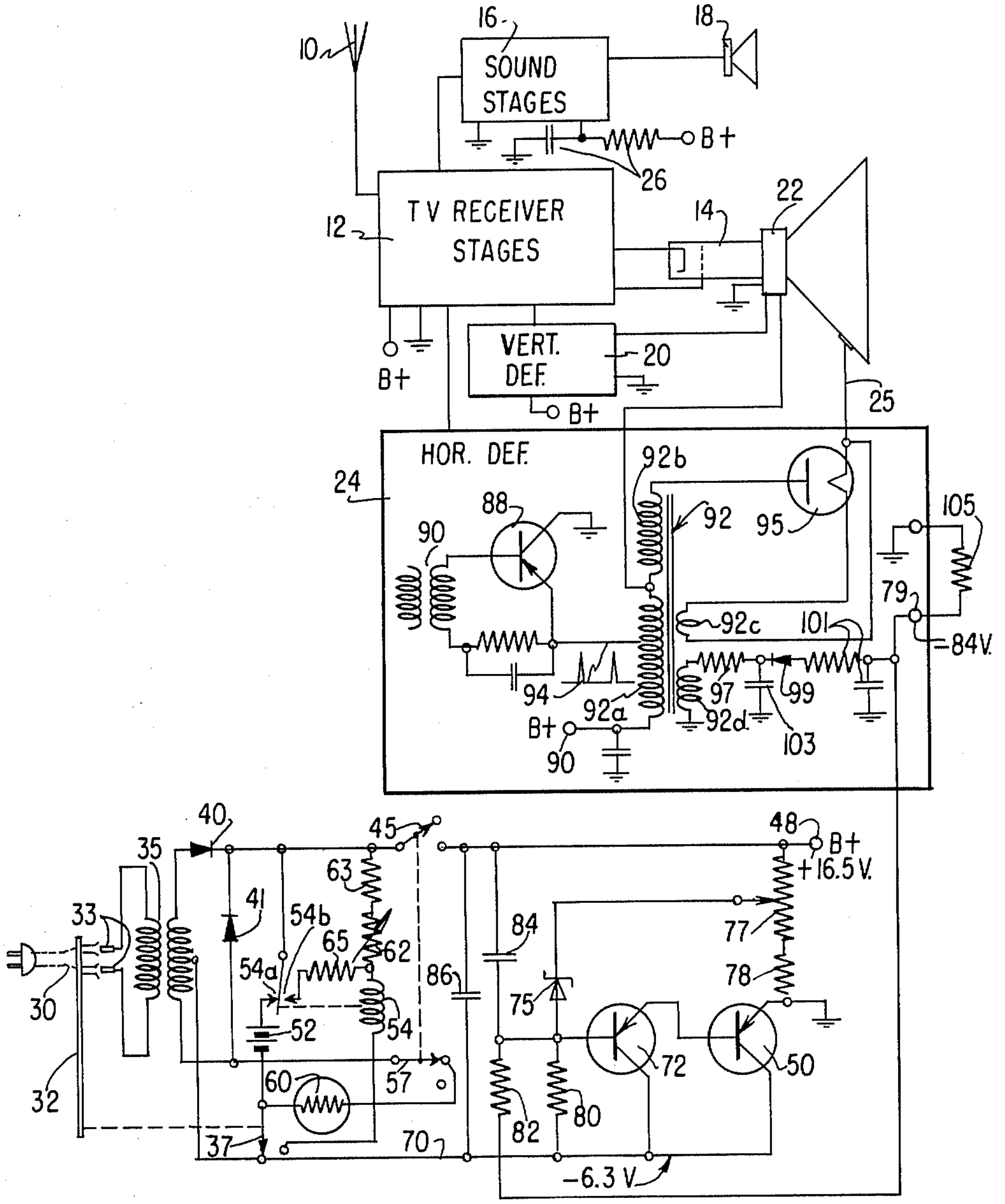
INVENTOR.
LAWRENCE J. MATTINGLY
BY Mueller · Aichele
ATTYS.

United States Patent Office 3,217,101
Patented Nov. 9, 1965

3,217,101
TELEVISION RECEIVER POWER SUPPLY
Lawrence J. Mattingly, Lombard, Ill., assignor to Motorola, Inc., Chicago, Ill., a corporation of Illinois
Filed Nov. 8, 1961, Ser. No. 150,981
5 Claims. (Cl. 178—7.3)

This invention relates to a voltage regulator and filter system and more particularly to such a system which is useful in a power supply for a transistorized television receiver.

Television receivers operating from alternating current power lines generally must be designed to operate satisfactorily with different power line supply voltages. For example, the receiver may be designed to operate with a minimum supply voltage of 105 volts and a maximum supply voltage of 130 volts. In transistorized television receivers such a wide input voltage range may pose a problem since transistors are often voltage sensitive so that they can be damaged if operated at excess voltages. On the other hand, merely using transistors which have ratings high enough to stand the maximum expected voltage can increase the receiver cost to an undesirable extent. Thus regulation of the operating potential in such a receiver can be very helpful to increase the reliability and reduce the cost thereof.

Furthermore, it has been common to incorporate a picture size control in a television receiver since the image size can vary with a change in input voltage level. Such a control further adds to the cost of the receiver. If the size control is omitted in the usual receiver, then the receiver manufacturer would generally adjust the receiver to give full picture size with about the minimum expected input operating voltage for the receiver. This can result in considerable overscanning, or excess size, when such a receiver is operated with an unusually high supply voltage.

While power line voltage variations are well-known problems in the manufacture of television receivers, similar difficulties can also be present when a battery is used to power a television receiver. The operating characteristics of a battery, or an energy storage unit, may show an excess voltage output during initial use after a full charge, and subsequent leveling off to a rated output voltage for the remainder of the useful energy supply period. Thus, even a battery supply can cause undesirable picture size changes or excess voltages within a television receiver.

During the initial warm-up of a television receiver with either an alternating current or a battery potential supply, but particularly with a battery potential supply, there can be excess current surges or voltage transients in a receiver and these may have an adverse effect on various receiver components. It may be noted that when a battery potential is initially applied to a transistorized television receiver, the potential is immediately applied from the battery to the receiver stages, and generally no power supply warm-up or receiver stage warm-up is involved. Accordingly, in the relatively high power, high frequency cricuits of a television receiver, transients can be developed in a way to cause undersirable component failure.

Therefore, it is an object of this invention to provide a filter and voltage regulator to apply a relatively constant potential to a utilization circuit from either a variable voltage energy storage cell or a power line and rectifier system providing a variable voltage.

Another object is to reduce voltage transients and initial power surges in a transistorized television receiver and at the same time improve reliability of the receiver.

A further object is to assist in maintaining picture size in a television receiver.

A further object is to provide a transistorized voltage regulator and filter which causes minimum voltage drop in the system at low supply voltages.

A still further object is to permit the use of relatively non-critical components in a transistorized voltage regulator and filter, thereby providing a low cost regulator and filter system.

A feature of the invention is the provision of a transistorized filter and regulator system using a zener diode circuit to establish a stabilized reference potential for a two stage emitter follower circuit, and which diode circuit is energized from an adjustable, relatively constant voltage source, so that the zener diode is non-critical as to voltage rating and may be of relatively low power dissipation.

Another feature is the provision of a transistorized television receiver in which a high voltage oscillator power supply is used to bias a transistorized regulator and filter circuit for the primary power source to operate the receiver, so that initial starting of the regulator is facilitated and sufficent regulator current is available for improved regulation.

A still further feature is the provision of a filter and regulator for direct current power source with an associated bias developing circuit for saturating the regulator transistors at low input voltage for reducing the regulator voltage drop and maximizing the voltage available for the load.

Another feature of the invention is the provision of a delaying circuit in a zener diode reference network for a transistorized regulator so that operation of the regulator to full voltage is initially delayed to prevent excess currents or damaging voltage transients when the system is first energized.

In the drawing the figure is a diagram, partly in block and partly schematic, showing a transistorized television receiver incorporating the invention.

In a specific form the invention comprises a transistorized filter and rectifier system for regulating current from an energy storage unit or regulating and filtering direct current from a rectifier circuit. The system has particular utility with a transistorized television receiver. A filter transistor is series connected between the power source and the receiver load. The base of the transistor is controlled by a further transistor the base of which is stabilized with a zener diode circuit. These transistors are connected as emitter followers so that the further transistor has relatively high input impedance. The stabilizing circuit includes a zener diode connected to an adjustable, but relatively constant, voltage source. The zener diode current is also established by a limited current voltage divider energized by a relatively high voltage source which is also controlled by the regulator. In this way, sufficient diode current is maintained, with non-critical zener diode tolerances, to establish a very stable reference potential over a wide input voltage range. The bias of the zener diode from the high voltage source will cause saturation of the filter transistor at low input voltage so that only a minimum of available voltage is dropped across the transistor in series with the load. The zener diode circuit also includes a capacitor which performs a filter function at the base of the control transistor and which will further cause slow response of the regulator upon initial energization so that an output voltage from the regulator is delayed in order to avoid the ill effects of voltage surges during the first instant of energization of the system.

In the figure, the television receiver shown includes an antenna 10 connected to the receiver stages 12 which may include such stages as a tuner, an intermediate frequency amplifier, a detector, a video amplifier, a synchronizing signal separator, and an automatic gain control system. Video signals are applied to the cathode ray picture tube 14 for reproduction on the screen thereof. The sound signal subcarrier is derived from the receiver stages 12 and applied to the sound stages 16 which include the necessary detector and amplifier circuits for properly driving the loudspeaker 18 to reproduce the audio signal accompanying the reproduced television image. The usual vertical or field synchronizing signals are applied to the vertical deflection system 20 which provides suitable sawtooth deflection signals to the yoke 22 on the neck of cathode ray tube 14. Similarly the necessary horizontal or line deflection signals are applied to the horizontal deflection system 24 which provides suitable sawtooth deflection currents for the yoke 22. The horizontal sweep system 24 also provides a high voltage of 15,000 volts or more on the lead 25 which is connected to the screen of the picture tube 14.

The receiver thus described may be all transistorized in the stages 12, 16, 20 and 24 except for the picture tube 14 and the high voltage rectifier 95 in stage 24. A receiver of this type has been commercially produced and its operation is therefore known in the art. It may be noted that the stages 12, 16, 20 and 24 each include an indication that they are connected to a B+ potential which is established with respect to ground. In the receiver being described this is furnished either by a suitable energy storage cell or a rectifier system energized by the alternating current power lines. The B+ potential for stages 16 is filtered additionally by filter network 26 to prevent audio frequencies from reaching other parts of the receiver.

In the power supply system there is a line cord 30 with an associated plug for connection to an alternating current wall type receptacle. The cord 30 is connected to a female connector 32 which may be connected to the male terminals 33. The primary winding of power transformer 35 is connected across the terminals 33. Female connector 32, when connected to the terminals 33, engages and mechanically operates the movable arm of switch 37, the purpose for which will be explained subsequently.

The secondary winding of power transformer 35 is connected between the anodes of the rectifiers 40 and 41. The cathodes of these rectifiers are connected together and to the movable arm of switch section 45. The fixed contact of switch 45 is connected directly to the B+ terminal 48 of the power supply and regulator system. It will be understood, of course, that terminal 48 is to be connected to the various other B+ terminals shown in other portions of the television receiver. The corresponding direct current return in the receiver is provided from the center tap of the secondary winding of transformer 35 through the collector and emitter path of filter transistor 50 and to the ground point. Accordingly, with switch section 45 closed and transformer 35 energized from the power lines, rectifiers 40, 41 will provide a full wave rectified output potential at terminal 48, which may be, for example, of the order of 16.5 volts.

For battery operation of the receiver the connector 32 is removed from the connector 33 so that switch 37 will be moved through its own spring bias to the illustrated position in which the negative terminal of battery 52 is connected to the collector electrode of transistor 50. The positive terminal of the battery will then be connected through the fixed contact **54*a* of the relay 54 to the arm of the switch section 45. Accordingly, in this situation the on-off switch 45 may be closed to complete the battery circuit between the ground reference point and through transistor 50, as well as the battery 52, to the B+ terminal 48**.

For purposes of charging the battery 52, which may preferably be in the form of an energy storage unit, a charging arrangement is provided which utilizes the circuit of rectifier 40. Charging of battery 52 occurs with the line cord 30 connected to power lines and the connectors 32, 33 joined together, in which case switch 37 is moved to the right hand position. It is further necessary that the on-off switch section 45 be in the open position, so the switch section 57, which is ganged to switch section 45, will be closed to complete a circuit from the lower side of the secondary winding of transformer 35 through switch section 57, thermistor 60 and to the negative terminal of battery 52. Furthermore, the positive terminal of battery 52 will be connected to the cathode of rectifier 40 through the switch contacts **54*a* of relay 54. Therefore, the battery 52 may be charged from a half wave circuit connected across the entire secondary winding of transformer 35. The positive temperature coefficient thermistor 60 serves to limit the current to the battery. In case the supply voltage from the power lines should be abnormally high, thermistor 60** would tend to stabilize the applied potential and prevent battery damage.

Provision is also made for automatically disconnecting the charging circuit when the battery has reached full charge. Relay 54 is connected from the right hand contact of switch 37 through the variable resistor 62 and the fixed resistor 63 to the cathode of rectifier 40. Resistor 62 is adjusted so that when the battery reaches full charge, and the load which the battery presents to the rectifier circuit permits the voltage across the battery to rise to a value indicative of full battery charge, relay 54 will energize to open the normally closed contacts **54*a*. Relay 54 may be of the thermal type. When the battery 52 has thus reached full charge to energize relay 54, the normally open contacts 54*b* thereof will close to connect resistor 65 in parallel with resistors 62, 63. Resistor 65 serves the purpose of increasing the current flow to relay 54 sufficiently to maintain this relay energized so that contact 54*a* will remain open to prevent further charging of the battery 52**.

Considering now the filter and regulator portion of the system, it may be seen that B+ terminal 48 forms a common conductor, that lead 70 from the center tap of the secondary winding of transformer 35 forms an input conductor and that the ground return connected to the emitter of transistor 50 is effectively an output terminal for the filter and regulator system. The collector-emitter path of transistor 50 is series connected between lead 70 and the reference point so that all of the current for the television receiver will be drawn through this transistor. The impedance of the emitter-collector path is varied in accordance with the variations of output voltage or "ripple" in the rectified potential so that a relatively constant output voltage is developed between ground and terminal 48.

The base electrode of transistor 50 is connected to the emitter electrode of transistor 72. The collector of transistor 72 is connected directly to lead 70. A zener diode 75 has its anode connected to the base electrode of transistor 72 and its cathode connected to the variable tap on potentiometer 77. Potentiometer 77 includes a fixed resistance portion series connected with resistor 78 between the B+ terminal 48 and ground. The zener diode circuit further includes a voltage divider comprising resistor 80 series connected with resistor 82 between lead 70 and terminal 79 in the horizontal deflection system 24. The junction of resistors 80, 82 is connected to the base electrode of transistor 72. Base electrode transistor 72 is bypassed to the B+ terminal 48 by means of capacitor 84. Capacitor 84 also serves a B+ filtering function, with its effect being increased by the gain of transistors 50, 72, since ripple at terminal 48 is applied to the base of transistor 72. A filter capacitor 86 is connected between B+ terminal 48 and the conductor 70 in order to perform a filtering function for the entire output potential from the rectifiers 40, 41.

In accordance with one important aspect of the filter and regulator system, a potential is available at terminal 79 which is high with respect to the value of the B+ potential which is to be regulated. In the particular example being described, a potential of minus 84 volts is available at terminal 79. Such a potential will provide base bias for initial conduction of transistor 72 and good zener diode current throughout the regulated range.

In order to produce a suitable potential at terminal 79, a rectifier system is incorporated with the horizontal output circuit of the television receiver. The horizontal output transistor 88 in the system 24 is driven by suitably synchronized signals applied thereto from transformer 90 to render transistor 88 cutoff during retrace of the cathode ray beam in tube 14. Transistor 88 is heavily conductive during forward trace of the beam in the cathode ray tube. During the beam scanning period the output current path for transistor 88 is from the B+ terminal 90 through the primary winding 92*a* of horizontal output transformer 92 and the emitter-collector path in the transistor to ground. It will be understood by those skilled in the television art that a sawtooth deflection current is produced in winding 92*a* and this is applied to the deflection yoke 22.

During beam retrace and cutoff of transistor 88, the primary winding 92*a* of transformer 90, together with other inductance and capacitance connected in the circuit, will oscillate or ring at a retrace frequency to produce the voltage waveform 94 at the emitter of transistor 88. This ringing is permitted for only one-half of the oscillatory cycle due to the reverse conduction of the transistor 88 (or conduction of a suitable damper diode connected to the primary winding 92*a,* which diode is not shown) and the ringing is stopped for the start of the next forward scanning signal of the beam.

The high frequency signals developed in the primary winding 92*a* may be utilized for energizing other rectifier circuits to produce high voltage for operating certain parts of the receiver. For example, the secondary winding 92*b* is connected in series with the primary winding 92*a* and to the anode of high voltage rectifier 95. The filament of the rectifier 95 is energized by winding 92*c* and there is available at this filament a high voltage potential of approximately 15 kv. or more for application through the high voltage lead 25 to the screen of picture tube 14.

An additional winding 92*d* is coupled to ground and through a resistor 97 to the cathode of rectifier diode 99. The anode of diode 99 is connected through the filter network 101 to the terminal 79. An additional filter capacitor 103 is connected between the cathode of rectifier 99 and ground. Accordingly, pulses 94 occurring at the horizontal deflection frequency are coupled to the transformer winding 92*d* and this signal is rectified and filtered to be available with respect to ground at the terminal 79. In the particular system under consideration this voltage may be of the order of negative 84 volts. A resistor 105 is also shown connected to terminal 79 and ground and this resistor represents further circuits of the receiver which may utilize this voltage source. These circuits may, for example, be the biasing network for the cathode ray picture tube 14 and the video amplifier stage driving the picture tube from the receiver stages 12.

The function of the zener diode circuit connected to the base of transistor 72 is to stabilize the potential at this base with respect to terminal 48 so that any tendency for changes in voltage between the terminal 48 and conductor 70 is reflected as a change in emitter-collector current of transistor 72. This change in current will in turn cause a change in base current of transistor 50 in a direction such that the conduction of transistor 50 varies inversely with the voltage variations so that any tendency for change in potential is reflected as a change in potential between emitter and collector of transistor 50, but the voltage of terminal 48 with respect to ground remains stable. Transistors 50 and 72 are connected as emitter followers. With the potential of the base of transistor 72 stabilized, the emitter potential thereof will tend to be stabilized and similarly the base and emitter electrodes of transistor 50 will tend to be voltage stabilized. With two emitter follower stages the zener diode circuit can be of relatively low power since it is operating into a high impedance base of transistor 72.

In a typical operation of this system it might be found that upon voltage variation in the alternating current power lines from 105 volts to 130 volts, the tendency for B+ change may be 2 or 3 volts on either side of the desired potential. However, this voltage variation will have but negligible effect on the stabilizing network for the base of transistor 72. Resistors 80, 82 are of relatively large value (forming a constant current source) and the potential across the voltage divider is greatly in excess of the value to which the regulator is designed to regulate.

With the zener diode 75 energized from a limited current, high voltage source, this will insure sufficient current through the diode despite a reduced input voltage to the regulator. Proper current is needed through the zener diode in order to maintain its conduction on a desirable portion of its characteristic curve. Furthermore, with the voltage divider 80, 82 having relatively high resistance values, the diode 75 will dissipate relatively small power even at high input voltages to the regulator since the current therethrough is derived in part from the limited current source, namely the divider 80, 82. It should be noted that resistor 80 may be relatively large, although its value must be low enough to insure that enough current will be conducted through the zener diode and the base electrode of transistor 72 so the regulator will permit sufficient output voltage that the horizontal oscillator in the horizontal deflection system 24 will be properly started to cause energization of transistor 88 and an output voltage at terminal 79. Once the potential at terminal 79 is developed the system will, of course, be operative to perform its full regulating function.

A voltage divider 77, 78 is connected across the regulated output potential of the system. This divider has a relatively low resistance value so that it forms a constant voltage source. It is preferable that this divider draw current high with respect to that which is conductive through the zener diode 75. Since a relatively high potential is available at terminal 79 to establish the overall zener diode current, it is possible to utilize a zener diode having a wide variation and conduction characteristic. It is only necessary that the potentiometer 77 be properly set for the desired potential at terminal 48 in relation to the exact conduction characteristics of the particular diode used.

It should further be appreciated that the filter and regulator system can be operated to provide very near the full output potential which is applied to the input thereof. Since the bias network for transistor 72 is derived from a relatively large negative voltage source, when the voltage input to the system falls below the value associated with conduction of the zener, transistors 72 and 50 will be driven into saturation by the bias source available from the voltage divider 80, 82 so that there is a minimum voltage loss across the emitter-collector path of transistor 50. This can be significant when utilizing a battery, or energy storage unit, such as battery 52.

Capacitor 84, in addition to performing a filter function at the base electrode of transistor 72, also causes some delay in the operation of the system when it is initially energized. As previously mentioned, a power source such as energy storage unit 52 will produce its maximum output immediately upon the closing of switch section 45. This may result in undesirable transients in the television receiver and initially high surge currents through its capacitors as they begin to charge. Capacitor 84 causes a slower build up of the B+ potential on terminal 48. When the system is initially energized by operation of switch 45, the base potential of transistor 72 will be at a very high positive value and it is only after capacitor 84 has charged to a normal value with the base of transistor 72 below ground that transistors 72 and 50 will be driven into their normal conductive states. Charging of capacitor 84 through resistor 80 may take a fraction of a second and during this time the B+ potential on terminal 48 will slowly increase which greatly assists in avoiding undesirable transients in the receiver. This has the decided advantage of improving transistor life and permitting use of less expensive transistors in the receiver.

In a system of practical construction parts values for the regular and filter system were as follows:

| | |
|---|---|
| Transistor **50** | Motorola type 4570. |
| Transistor **72** | Motorola type 4510. |
| Zener diode **75** | Motorola type 4552. |
| Potentiometer **77** | 500 ohms. |
| Resistor **78** | 680 ohms. |
| Resistor **80** | 10,000 ohms. |
| Resistor **82** | 47,000 ohms. |
| Capacitor **84** | 10 microfarads. |
| Capacitor **86** | 2500 microfarads. |

The voltage regulator and filter system thus described permits the use of a relatively non-critical zener diode and affords adjustment for exact setting of the system to match any particular diode which may be used. Furthermore, the system is operative for both a power line rectifier voltage source and a battery or energy storage unit source, either of which may be subject to voltage variation during use. The system responds rapidly enough to filter ripple encountered in the usual power line rectifier system. It can be appreciated that the system is of relatively low cost, since non-critical parts may be used, and that it affords regulation of a type which will stabilize the operation of the television receiver to which it is connected. For example, it is possible to maintain relatively constant picture size despite relatively wide voltage input variations from the power line to the receiver. In this way, it is unnecessary to utilize or otherwise adjust the picture size in the television receiver when different voltage inputs are used to power the receiver. In addition, with a regulated voltage supply for a television receiver of the transistorized type, and particularly a supply which is delayed in its application when initially energizing the receiver, greater reliability and reduced component damage in the receiver are realized since voltage and current surges can be avoided.

I claim:

1. In a television receiver having a horizontal deflection system with a source of deflection signals therein, a power supply system including in combination, potential supply means, an energizing circuit connecting said potential supply means to the television receiver for applying operating energy thereto, a first transistor having emitter, collector and base with said emitter and collector being series connected between the television receiver and said energizing circuit, a second transistor connected as an emitter follower to said base of said first transistor, said second transistor further having a base electrode, a potential divider connected across the interconnection of the television receiver and said energizing circuit, means for deriving energy from the horizontal deflection system and including a rectifier circuit to provide a direct current potential higher than the potential from said potential supply means, a base biasing network connected between said rectifier circuit and said base electrode of said second transistor, and a zener diode connected between said base electrode of said second transistor and an intermediate point of said voltage divider, said base biasing network providing a potential to cause saturation of said first transistor upon reduction in potential of said potential supply means causing cutoff of said zener diode.

2. In a television receiver having a horizontal deflection system with a source of deflection signals therein, a power supply system including in combination, potential supply means providing a potential subject to variation, a conductor connecting said potential supply means to the television receiver for applying operating energy thereto, a first transistor having emitter, collector and base electrodes, means connecting said emitter and collector electrodes in series with the television receiver and said potential supply means, a second transistor having emitter, collector and base electrodes, means connecting said emitter electrode of said second transistor to said base electrode of said first transistor and means connecting said collector electrode of said second transistor to said collector electrode of said first transistor, a potential divider connected between said conductor and said emitter electrode of said first transistor, means for deriving energy from the horizontal deflection system and including a rectifier circuit to provide a direct current potential higher than that provided by the potential from said potential supply means, a base biasing network connected to said base electrode of said second transistor and between said rectifier circuit and said collector electrode of said second transistor, a zener diode connected between said base of said second transistor and an intermediate point of said voltage divider, said base biasing network providing a potential to cause saturation of said first transistor upon reduction in potential from said potential supply means causing cutoff of said zener diode, and a filter capacitor connected between said conductor and said base electrode of said second transistor.

3. A voltage regulator and filter circuit, including in combination, a potential supply means for a direct current voltage to be regulated and filtered, a load supply circuit, a first transistor having emitter, collector and base electrodes with said emitter and collector electrodes thereof connected between said potential supply means and said load supply circuit, a second transistor having output electrodes connected between said base electrode and said potential supply means, said second transistor having an input electrode, a first potential divider connected across said load supply circuit to be energized by a regulated potential, a potential source energized by said load supply circuit and providing a voltage in excess of the direct current voltage to be regulated, a second potential divider connected between said potential source and said potential supply means, a zener diode connected between intermediate points of said first and second potential dividers, means connecting said zener diode and said second potential divider to said input electrode of said second transistor, said first potential divider having a resistance value selected to provide a relatively constant potential for said zener diode and said second potential divider having a resistance value selected to provide a relatively constant current for said zener diode, a filter capacitor connected between said potential supply means and said input electrode, said capacitor being initially chargeable through a portion of said second potential divider, whereby conduction of said zener diode provides a relatively stabilized bias potential for said second transistor and said second transistor controls said first transistor for regulation and filtering of the direct current voltage.

4. A voltage regulator circuit, including in combination, potential supply means for a direct current voltage to be regulated, a load supply circuit, a first transistor having emitter, collector and base electrodes with said emitter and collector electrodes thereof connected between said potential supply means and said load supply circuit, a second transistor having output electrodes connected between said base electrode and said potential supply means, said second transistor having an input electrode, a first potential divider connected across said load supply circuit to be energized by a regulated potential, a potential source energized by said load supply circuit and providing a voltage in excess of the direct current voltage to be regulated, a second potential divider connected between said potential source and said potential supply means, a zener diode connected between intermediate points of said first and second potential dividers, means connecting said zener diode and said second potential divider to said input electrode of said second transistor, said first potential divider having a resistance value selected to provide a relatively constant potential for said zener diode and said second potential divider having a resistance value selected to provide a relatively constant current for said zener diode, whereby conduction of said zener diode provides a relatively stabilized bias potential for said second transistor and said second transistor controls said first transistor for regulation of the direct current voltage.

5. A voltage regulator circuit, including in combination, potential supply means for a direct current voltage to be regulated, a load supply circuit, a first transistor having emitter, collector and base electrodes with said emitter and collector electrodes thereof connected between said potential supply means and said load supply circuit, a second transistor having output electrodes connected between said base electrode and said potential supply means, said second transistor having an input electrode, a potential source energized by said load supply circuit and providing a voltage in excess of the direct current voltage to be regulated, a potential divider connected between said potential source and said potential supply means, a zener diode coupled between an intermediate point of said potential divider and said load supply circuit, said zener diode and said potential divider being connected to said input electrode of said second transistor, said potential divider having a resistance value selected to provide a relatively constant current for said zener diode, whereby conduction of said zener diode provides a relatively stabilized bias potential for said second transistor and said second transistor controls said first transistor for regulation of the direct current voltage.

References Cited by the Examiner

UNITED STATES PATENTS

| | | | |
|---|---|---|---|
| 2,906,941 | 9/59 | Brolin | 323—22 |
| 2,976,474 | 3/61 | Dodge | 323—22 |
| 2,995,697 | 8/61 | Grenier | 323—22 |
| 3,049,591 | 8/62 | Voige | 178—7.3 |

DAVID G. REDINBAUGH, *Primary Examiner.*

JOHN W. HUCKERT, *Examiner.*